United States Patent

[11] 3,624,052

| [72] | Inventors | Riad H. Gobran<br>Levittown;<br>Stephen W. Osborn, Yardley, both of Pa. |
|---|---|---|
| [21] | Appl. No. | 165,034 |
| [22] | Filed | Jan. 8, 1962 |
| [45] | Patented | Nov. 30, 1971 |
| [73] | Assignee | Thiokol Chemical Corporation<br>Bristol, Pa. |

[54] HIGH MOLECULAR WEIGHT POLY(PROPYLENE SULFIDE)
3 Claims, No Drawings

[52] U.S. Cl. .................................................. 260/79 R,
260/37 R, 260/41 R, 260/79.7 R
[51] Int. Cl. .................................................. C08g 23/00
[50] Field of Search ........................................... 260/79,
327, 79.7

[56] References Cited
UNITED STATES PATENTS
| 1,976,678 | 10/1939 | Wittwer................... | 260/2 |
| 2,183,860 | 12/1939 | Caltof..................... | 260/79 |
| 2,891,072 | 6/1959 | Remes et al. ............ | 260/327 |
| 3,000,865 | 9/1961 | Gurgiolo ................ | 260/79 |

OTHER REFERENCES

Furukawa et al. II Journal of Polymer Science, Vol. 36, pages 541– 543, April, 1959.

Ohta et al. " Studies on Ethylene Sulfide I Polymerization of Ethylene Sulfide" as reported in Chem. Abstracts, Vol. 51, 1957, page 14,668.

Marvel et al. Journal of the American Chemical Society, Volume 76, 1954, p. 61.

*Primary Examiner*—James A. Seidleck
*Attorney*—Curtis, Morris & Safford

ABSTRACT: Elastomeric propylene sulfide polymers prepared with a diethyl zinc-water catalyst or a diethyl zinc-hydrogen sulfide catalyst system are described.

HIGH MOLECULAR WEIGHT POLY(PROPYLENE SULFIDE)

The present invention relates to solid polymers and copolymers of propylene sulfide, and more particularly to polymers and copolymers of propylene sulfide that are nontacky elastomers of relatively high molecular weight. The homopolymers of the present invention are thermoplastic products that are moldable under conventional molding conditions to produce elastomeric articles in any of various desired configurations. The copolymers are vulcanizable by conventional vulcanizing techniques to produce vulcanizates having good physical properties and solvent resistance; hence they can be used for many of the applications for which vulcanized rubbers are used.

While previous attempts have been made by those skilled in the art to produce high molecular weight propylene sulfide polymers, these prior efforts, so far as we are aware, have been unsuccessful since the polymers produced have been of relatively low molecular weight and have lacked the desired solvent resistance. It is accordingly an object of the present invention to provide propylene sulfide polymers and copolymers having molecular weights substantially higher than those of the propylene sulfide polymers previously produced. It is another object of the invention to provide elastomeric propylene sulfide polymers which have good high temperature molding properties and which are vulcanizable to produce vulcanizates having good physical properties. It is still another object of the invention to provide a novel and effective method of making such high molecular weight propylene sulfide polymers and copolymers. Other objects of the invention will be in part obvious and in part pointed out hereafter.

The present invention is based on the unexpected discovery that if propylene sulfide is polymerized in the presence of a catalyst which is a reaction product of diethyl zinc and water or of diethyl zinc and hydrogen sulfide, a solid elastomer of relatively high molecular weight is obtained. When the catalyst is properly prepared and polymerization is carried out as described hereafter, novel solid polymers are obtained which are nontacky elastomers that are moldable to a variety of desired configurations.

The molecular weights of the homopolymers of the present invention have been appraised by determining the intrinsic viscosity $[n]$ of the polymer in solution in solvents such as methylene chloride and chloroform at 30° C. The polymers have been found to have intrinsic viscosities as high as 3 or higher, usually within the range 3 to 5. Also the polymers are relatively stable in diffused light, and when prepared in pure form, are relatively stable to prolonged exposure to direct sunlight and ultraviolet radiation. They are substantially insoluble in benzene, methylene chloride, hexane and chloroform, i.e., their solubility in these solvents does not exceed about 1 percent by weight of the solvent. Intrinsic viscosity measurements of the type referred to above have been made using solutions wherein the amount of dissolved polymer is of the order of 0.1 to 0.2 percent.

It has been found that the homopolymers of propylene sulfide produced in accordance with the present invention cannot readily be cured with conventional cross-linking agents. In instances where a tight cure is required, it is desirable to copolymerize the propylene sulfide with a minor proportion of an unsaturated aliphatic episulfide cross-linking agent such as allylthioglycidyl ether, vinyl-cyclohexene episulfide, or butadiene monoepisulfide. As described in further detail hereafter, the propylene sulfide and cross-linking agent are mixed in such proportions that the cross-linking agent comprises from 3 to 20 percent by weight, preferably 3 to 5 percent by weight, of the monomeric mixture. Copolymers produced by polymers produced by polymerization of this mixture can be cured by conventional rubber-vulcanizing techniques.

As indicated above, the catalyst used in preparing the present polymers is a reaction product of diethyl zinc and either water or hydrogen sulfide. The diethyl zinc-water catalyst may be prepared by reacting the diethyl zinc and water in an inert hydrocarbon solvent, e.g. benzene or hexane, at a temperature of 0° to 85° C., preferably 20° to 50° C. The molar ratio of diethyl zinc to water may vary from about 1:1 to 3:1 and is preferably approximately 1:1. To insure optimum catalyst activity and the attainment of the highest molecular weights, the catalyst should be used within a period of not more than 48 hours after it is prepared and preferably as soon as possible after it is prepared. In most cases it will be found desirable to prepare the catalyst in the polymerization reaction vessel just prior to or coincident with the initiation of the polymerization reaction.

It has been found important that the preparation of the catalyst and also the polymerization reaction by carried out in an environment substantially free from elemental oxygen. Thus catalyst preparation and polymerization are desirably carried out in an atmosphere of inert gas such as nitrogen, helium, or argon containing less than about 20 parts per million of oxygen. Commercially available grades of diethyl zinc have been found suitable for use in the present invention. The water with which the diethyl zinc is reacted should be distilled water, preferably deoxygenated by boiling in air and cooling under a pure nitrogen atmosphere. The hydrocarbon solvent used in preparation of the catalyst should desirably be either dried over sodium or freshly distilled.

The diethyl zinc-hydrogen sulfide catalyst can be prepared in the same general manner as indicated above for the diethyl zinc-water catalyst. The molar ratio of $H_2S$ to diethyl zinc employed may vary from about 0.5:1 to 1.2:1 with the preferred ratio being about 1:1. The diethyl zinc may be dissolved in the solvent and $H_2S$ gas bubbled through the solution or alternatively, a standard, saturated solution of $H_2S$ in hydrocarbon solvent can be mixed in predetermined proportions with a standard solution of diethyl zinc in a hydrocarbon solvent. The diethyl zinc-$H_2S$ catalyst, like the diethyl zinc-water catalyst, should be freshly prepared in a substantially oxygen-free and anhydrous environment.

Details of the polymerization process are given in the specific examples set forth below. In general, the polymerization process is executed by bringing the monomeric propylene sulfide or mixture of propylene sulfide and cross-linking agent into contact with the catalyst prepared in the general manner described above. The catalyst is used to the extent of about 0.05 to 3 percent, preferably 1 to 2 percent based on the weight of the monomeric material being polymerized. The polymerization can be carried out satisfactorily at temperatures of 20° to 60° C. in 2 to 25 hours and is preferably conducted at 25° to 35° C. for 15 to 20 hours.

The polymerization reaction may be conducted without using a solvent, or any of various inert organic solvents can be used such as aromatic hydrocarbons, e.g. benzene, toluene, or xylene; aliphatic hydrocarbons, e.g. isopentane, n-hexane, or octane; or chlorinated hydrocarbons, e.g. carbon tetrachloride, methylene chloride, or ethylene chloride. The reaction mixture may be agitated to facilitate the reaction. The pressure at which the reaction is carried out does not appear to be particularly critical. Thus the reaction may be conducted in an open vessel at atmospheric pressure or in a closed vessel under autogenous pressure. In either case the reaction mixture should be kept oxygen-free by the use of an atmosphere of purified inert gas. In modifications of the process wherein a solvent is used, the reaction vessel is desirably charged with the solvent, catalyst and monomer in that order; where no solvent is used, it is preferable to perform the catalyst and then react the preformed catalyst with the monomer. The reaction system should be anhydrous except for the amount of water required to form the diethyl zinc-water catalyst as described above.

In order to point out more fully the nature of the present invention, the following specific examples are given of illustrative methods of making the present products. In all of the examples the polymerization and catalyst solvents were either predried over sodium or freshly distilled. The water used was distilled water from which free oxygen had been removed by boiling for 10 minutes in air followed by cooling under a nitrogen atmosphere. In most of the experiments the product polymer contained physically bound solvent which was removed by evaporation, first at room temperature and then in a vacuum oven at elevated temperature. The bottles to be used as reaction containers were washed with soap, rinsed several times with distilled water, and baked in an oven at 110° C. for 2–4 hours before use. Intrinsic viscosity determinations were made according to standard procedures using a Cannon-ubbelohde Dilution Viscometer.

EXAMPLE I

A bottle was flushed with nitrogen, charged successively, under a nitrogen atmosphere, with 50 ml. (0.64 mols) of propylene sulfide, 150 ml. of benzene, 1.76 ml. (0.0081 mol) of a 55.8 percent solution of diethyl zinc in benzene and 0.14 g. (0.0078 mol) of oxygen-free $H_2O$ and then capped. This gave a catalysts system having approximately a 1:1 mol ratio of zinc diethyl to $H_2O$. The amount of the catalyst used was approximately 2 percent by weight of the monomer.

Within 5 minutes the polymerization reaction began and within 15 minutes the heat of the exothermic reaction had raised the temperature of the reaction system to approximately 50° C. A clear, slightly orange-colored solid began to form at this time. The bottle and contents were then tumbled in a 63° C. tumbling bath for 4 hours. At the end of this time the bottle and contents were removed from the tumbling bath and cooled to room temperature. The product was removed from the bottle and the solvent was evaporated therefrom, first in a current of air and then in a vacuum oven at 1 mm./40° C. for 24 hours. Quantitative yields of a nontacky, slightly orange-colored elastomer which was substantially insoluble in benzene were recovered.

EXAMPLE II

A bottle was flushed with nitrogen, charged successively under a nitrogen atmosphere with 50 ml. (0.64 mols) of propylene sulfide, 150 ml. of hexane, 0.14 g. (0.0078 mols) of oxygen-free water and 1.76 ml. (0.0081 mols) of a 55.8 percent solution of diethyl zinc in benzene and the bottle was capped. Upon standing at room temperature for about 20 minutes a white precipitate started to form slowly. The sealed bottle was then placed in a 63° C. tumbling bath for 4 hours. At the end of this time the inside of the bottle was coated with a film of a partially clear, partially cloudy, rubbery polymer. The liquid phase remaining in the bottle was clear. 31.3 g. of a nontacky, solid, elastomer were recovered after evaporating the solvent. The elastomer was substantially insoluble in benzene.

EXAMPLE III

A bottle was flushed with nitrogen, charged successively with 150 ml. of benzene and 0.135 ml. (0.0075 mols) of oxygen-free water, flushed again with nitrogen, charged successively with 1.91 ml. (0.0081 mols) of a 52 percent solution of diethyl zinc in benzene and 50 ml. (0.64 mols) of propylene sulfide and then capped. The reaction system turned milky-white immediately after the addition of all the reactants. The sealed bottle was then placed in a 60° C. tumbling bath for 4 hours. The bottle and its contents were then cooled to room temperature. After the solvent had been evaporated from the product, first in air and then in a vacuum oven at room temperature, 42.8 g. of a fairly translucent, nontacky, rubberlike solid polymer was obtained. The polymer was substantially insoluble in benzene.

EXAMPLE IV

Two bottles were each flushed with nitrogen and each was charged under a nitrogen atmosphere with 200 ml. of benzene, 0.27 ml. (0.0150 mols) of oxygen-free water and 3.8 ml. (0.0162 mols) of a 52 percent solution of zinc diethyl in benzene. The bottles were then capped and placed in a 60° tumbling bath for 2 hours. At the end of this period the bottles were removed from the bath and cooled to room temperature. The bottles were then opened under a nitrogen atmosphere, charged with 100 ml. (1.28 mols) of propylene sulfide, each capped again and allowed to stand at a temperature of 25°–30° C. for approximately 20 hours. After removal of the solvent from the product by evaporation, first in air and then in a vacuum oven at room temperature, 197.9 grams (92 percent of theory) of a white, rubbery polymer was obtained. The polymer was substantially insoluble in benzene.

EXAMPLE V

A bottle was flushed with nitrogen and successively charged, under a nitrogen atmosphere, with 300 ml. of benzene, 0.17 ml. (0.0095 mols) of oxygen-free water and 2.0 ml. (0.0114 mols) of a 0.0057 mol/ml. solution of diethyl zinc in benzene and then capped with aluminum foil. The bottle was shaken every 5 minutes over a 30 minute period. The aluminum foil cap was removed, the bottle was again flushed with nitrogen and 100 ml. (94.6 g. or 1.28 mols) of propylene sulfide were added thereto. The bottle was again capped with aluminum foil and allowed to stand at room temperature for approximately 30 minutes. The bottle was then capped with a metal bottle cap and allowed to stand at approximately 32° C. for a period of approximately 18 hours. After removal of the solvent by evaporation, first in air and then in a vacuum oven at 45° C./1 mm. Hg, a whitish yellow, slightly sticky solid polymer which was substantially insoluble in benzene was obtained.

Three additional runs were made of this experiment and a total yield of 356.5 g. (94.3 percent of theory) was obtained.

EXAMPLE VI

A bottle was flushed with nitrogen, and successively charged with 300 ml. of freshly distilled methylene chloride, 0.30 ml. (0.0168 mols) of water and 4.0 ml. (0.0224 mols) of a 0.00561 mol/ml. solution of diethyl zinc in benzene. The contents of the bottle were then mixed thoroughly under a nitrogen atmosphere. The bottle and contents were then allowed to stand at room temperature for 40 minutes, after which time the reaction system had assumed a bright yellow color and contained quantities of a white solid. One-hundred milliliters (1.28 mols) of propylene sulfide were then charged into the reaction system which immediately began to heat up. The polymerization was allowed to proceed for a period of about 18 hours at approximately 32° C. After evaporation of the solvent, first in air and then in a vacuum oven at 43° C. /1 mm. Hg, a yellow solid polymer which was substantially insoluble in benzene was obtained.

Three additional runs were made of this experiment, and a total yield of 340.9 g. of polymer (90 percent of theory) was obtained.

EXAMPLE VII

A bottle was flushed with nitrogen and charged successively with 150 ml. of benzene and 0.135 ml. (0.0075 mol) of oxygen-free water. The bottle was again flushed with nitrogen, and 1.91 ml. (0.0081 mol) of a 52 percent solution of diethyl zinc in benzene was charged into the bottle and the bottle was capped. The bottle and its contents were then placed in a 60° C. tumbling bath for 2 hours. After this time the bottle was opened under a nitrogen atmosphere and the bottle and its contents were cooled. Fifty milliliters (0.65 mols) of propylene sulfide were then added to the bottle. The bottle was again flushed with nitrogen and capped. The bottle and its contents were allowed to stand at room temperature for about 20 hours. 45.6 g. (85.5 percent of theory) of a yellowish rubber was obtained after the solvent had been evaporated, first in air and then in a vacuum oven (1 mm.) at room temperature. The polymer was substantially insoluble in benzene.

Shortly after being produced, the polymer had an intrinsic viscosity $[n]$ of 3.74 in methylene chloride at 30° C.

EXAMPLE VIII

A bottle was flushed with nitrogen and successively charged with 150 ml. of benzene, 1.8 ml. (0.0081 mol) of a 53 percent solution of diethyl zinc in benzene, 0.14 ml. (0.0078 mol) of oxygen-free water and 50 ml. (0.64 mols) of propylene sulfide. The mixed reagents formed a clear solution. The bottle was capped and placed in a 60° C. tumbling bath for 3.5 hours. The bottle was then removed from the bath and cooled to room temperature. After evaporation of the solvent from the product, first in air and then in a vacuum oven at room temperature overnight, 41.9 g. of a clear, light amber colored solid material was obtained which was a nontacky elastomer. The elastomer was substantially insoluble in benzene and had an intrinsic viscosity of 3.2 in methylene chloride at 30° C.

EXAMPLE IX

This example illustrates the preparation of a copolymer of propylene sulfide and allylthioglycidyl ether. The ether used as a starting material can be prepared by reacting allylglycidyl ether with thiourea in an aqueous medium in the presence of sulfuric acid, and then neutralizing the reaction products. The reaction proceeds satisfactorily at room temperature. The ether separates as an oily layer above the aqueous medium.

A bottle was flushed with nitrogen; charged successively with 150 ml. of benzene, 50.0 ml. (0.64 mols) of propylene sulfide, 4.17 g. (0.032 mols) of allylthioglycidyl ether and 0.14 ml. (0.0078 mol) of oxygen-free water; flushed again with nitrogen and charged with 1.9 ml. (0.0081 mol) of a 52 percent solution of diethyl zinc in benzene. The resulting solution was clear. The bottle was capped and the bottle and contents were placed in a 60° C. tumbling bath for 3.5 hours. The bottle was removed from the bath and cooled to room temperature. After removal of the solvent from the product by evaporation, first in air and then in a vacuum oven (1 mm.) at room temperature, 41.9 g. (73 percent of theory) of a slightly yellowish rubber was obtained which was substantially insoluble in benzene.

EXAMPLE X

Four bottles were each flushed with nitrogen and each was successively charged with 300 ml. of benzene, 0.15 ml. (0.0095 mols) of oxygen-free water, and 2.0 ml. (0.0114 mols) of 0.0057 mol/ml. solution of diethyl zinc in benzene, and allowed to stand under a nitrogen atmosphere for 30 minutes. Each bottle was then shaken for 30 seconds every 5 minutes over a 30-minute period. Each bottle was again flushed with nitrogen, successively charged with 100 ml. (94.6 g. or 1.28 mols) of propylene sulfide and 8.5 ml. (8.32 g. or 0.064 mols) of allylthioglycidyl ether, flushed again with nitrogen and allowed to stand at room temperature for 30 minutes while covered with an aluminum foil cap. The bottles were then capped with metal caps and allowed to stand 20 hours at a temperature of 26° C. The product of the reactions in all the bottles was an immobile solid gel which was slightly more opaque than the corresponding homopolymeric product. After the solvent was removed by evaporation, first in air and then in a vacuum oven at 40° C. under full vacuum (40° C./1 mm. Hg), 381.2 g. of a clear rubbery polymer were obtained (93 percent of theory). The polymer was substantially insoluble in benzene.

EXAMPLE XI

Four bottles were each flushed with nitrogen and each was charged successively with 300 ml. of benzene, 0.15 ml. (0.0095 mols) of oxygen-free water, 2.0 ml. (0.0114 mol) of a 0.00570 mol/ml. solution of zinc diethyl in benzene and allowed to stand for 30 minutes under a nitrogen atmosphere. The bottles were then shaken for 30 seconds every 5 minutes over a 30-minute period. The bottles were again flushed with nitrogen, successively charged with 100 ml. (94.6 g. or 1.28 mols) of propylene sulfide and 8.5 ml. (8.32 g. or 0.064 mols) of allylthioglycidyl ether and again flushed with nitrogen. The bottles were then capped and placed in a 60° C. tumbling bath for 18 hours. The bottles and their contents were cooled to room temperature. After the solvent was evaporated, first in air and then in a vacuum oven at 40° C./1 mm. Hg, 370 g. (89.8 percent of theory) of a clear yellowish polymer were obtained which was substantially insoluble in benzene.

EXAMPLE XII

Two bottles were each flushed with nitrogen and each was successively charged with 150 ml. of benzene, 3.0 ml. (0.0162 mol) of a 5.42 molar solution of diethyl zinc in benzene and 0.28 ml. (0.0155 mol) of oxygen-free water. The bottles were then capped and tumbled in a 60° C. bath for 2 hours. The bottles were cooled to room temperature, opened under a nitrogen atmosphere and each was charged with 100 ml. (94.6 g. or 1.28 mol) of propylene sulfide and 8.31 ml. (8.31 g. or 0.064 mol) of allylthioglycidyl ether. The bottles were again flushed with nitrogen, capped and allowed to stand overnight in a water bath at 25°–30° C. In the morning both bottles contained solid polymerization products.

One of the two bottles was allowed to stand for a further period of 72 hours at room temperature, after which the product was removed from the bottle and dried in air for 1 week to yield 95.8 g. (93.4 percent of theory) of a nontacky snappy white elastomer having an intrinsic viscosity [n] of 3.0 in methylene chloride at 30° C. The other bottle was allowed to stand for 168 hours before its contents were air dried. The yield from the second bottle was 106 g. (103 percent of theory) of a product of similar physical properties having an intrinsic viscosity of 2.70. Both products were insoluble in benzene.

A mixture of these copolymers was cured for 40 minutes at 307° F. using the following cure formulation in parts by weight.

| | |
|---|---|
| Copolymer | 100 |
| Philblack (HAF Carbon Black—filler) | 50 |
| Zinc Oxide | 5 |
| Stearic Oxide | 3 |
| Sulfur | 2 |
| Methyl Tuads (tetramethylthiuran disulfide | 1 |
| Tellurac (Tellyrium Diethylthiocarbonate) | 0.5 |

The cured elastomer had a modulus of 338; tensile strength—348; elongation—220; Shore A hardness—68.

EXAMPLE XIII

A hydrogen sulfide-zinc diethyl catalyst was prepared by reacting 0.016 mols of $H_2S$ dissolved in 25 ml. of benzene at 20° C. with 0.016 mols of zinc diethyl in a standard benzene solution.

A clean 30-ounce bottle was flushed with nitrogen, and 300 ml. of benzene was distilled from sodium directly into the bottle. The preformed $H_2S$-zinc diethyl catalyst was then added to yield a mixture that was cloudy and was blanketed with nitrogen.

Thereafter 300 ml. of twice distilled propylene sulfide was fractionally distilled into the bottle from calcium hydride using a 300 mm. Widmer column, and 17.5 ml. (3.5 mol percent) of freshly distilled allylthioglycidyl ether (B.P. 85°–86° C./25 mm.) was added to the bottle by means of a pipette. The bottle was capped with aluminum foil and swirled to effect a complete mixing of the mixture. The reaction was conducted at room temperature (25°–30° C.) for about 12 hours. The polymers produced were tack free, soft, milky white materials.

A solubility test was conducted by attempting to dissolve 1 gram of the polymer in approximately 100 ml. benzene by shaking the solvent and the polymer together at room temperature (25°–30° C.) for about 48 hours. The polymer was in the solvent for a total of 72 hours and was soluble at this 1 percent concentration. The intrinsic viscosity measured in chloroform at 30° C. was 3.36.

EXAMPLE XIV

A clean 30-ounce bottle was flushed with nitrogen, and 300 ml. of benzene was distilled from sodium directly into the bottle. To the bottle was added 25 ml. of a saturated solution of $H_2S$ in benzene (0.016 mols of $H_2S$ in 25 ml. of benzene at 20° C.), and 300 ml. of twice distilled propylene sulfide was fractionally distilled into the bottle from calcium hydride using a 300 mm. Widmer Column. The 17.5 ml. (3.5 mol percent) of freshly distilled allylthioglycidyl ether (B.P. 85°–86° C./25 mm.) was added to the bottle by means of a pipette, and finally 0.016 mols diethyl zinc in a standard solution in benzene was added by means of a calibrated syringe. The mixture, which became cloudy immediately, was again blanketed with nitrogen. The bottle was capped with aluminum foil and swirled to effect a complete mixing of the mixture. After an induction period of 5 to 10 minutes, the mixture became noticeably more viscous, and after 20 to 25 minutes the temperature reached 35°–40° C. as the polymerization proceeded exothermically.

After the temperature reached 40° C., the mixture gelled within 5 minutes and the polymerization proceeded to completion at the boiling point of the solvent (75°–80° C.) as indicated by visible bubbling of the mixture and the presence of vapors at 75°–80° C. over the polymer mass. The evolution of heat took 15 to 30 minutes, and the mixture was allowed to cool and stand at room temperature for 24 hours. The bottle was cracked open to remove the polymer, and the benzene was evaporated in a vacuum at 1 mm. Hg to yield tack-free, soft, milky white materials. The polymer was soluble according to the solubility test procedure as described in example XIII to substantially the same extent as the polymer of example XIII. The intrinsic viscosity measured in chloroform at 30° C. was 2.81.

The rubbery product of 6 runs according to the procedure of this example was combined with the product of 5 runs according to example XIII to give an overall yield of 2,229 grams (86.2 percent). The combined product was subjected to infrared analysis to determine the allylthioglycidyl ether in the copolymer. The I. R. band of allylthioglycidyl ether at 1640 cm.$^{-1}$ was used to measure the amount of this comonomer that was copolymerized into the copolymer. The infrared absorbance exhibited by the sample tested was compared with a standard curve prepared by mixing known amounts of allylthioglycidyl ether with homopolymeric propylene sulfide in methylene chloride. The analysis indicated that the ether component was 3.48 mol percent of the copolymer.

EXAMPLE XV

A clean 30-ounce bottle was flushed with nitrogen, and 300 ml. of benzene was distilled from sodium directly into the bottle. To the bottle was added a preformed $H_2S$-zinc diethyl catalyst of the same type and amount as in example XIII. The resulting solution was cloudy and was blanketed with nitrogen. Then 300 ml. of twice-distilled propylene sulfide was fractionally distilled into the bottle from calcium hydride using a 300 mm. Widmer Column. The bottle was capped with aluminum foil and swirled to effect a complete mixing of the mixture. The reaction was conducted at room temperature (25°–30° C.) for about 12 hours. The polymers produced were tack-free, soft, milky white materials. The combined yield for the two runs was 475.8 g. (97.8 percent).

EXAMPLE XVI

A clean 30-ounce bottle was flushed with nitrogen, and 300 ml. of benzene was distilled from sodium directly into the bottle. To the bottle was added 25 ml. of a saturated solution of $H_2S$ in benzene (0.016 mols of $H_2S$ in 25 ml. of benzene at 20° C.), and 300 ml. of twice-distilled propylene sulfide was fractionally distilled into the bottle from calcium hydride using a 300 mm. Widmer column. Then 0.016 mols of diethyl zinc in a standard solution in benzene was added by means of a calibrated syringe. The mixture, which became cloudy immediately, was again blanketed with nitrogen. The bottle was capped with aluminum foil and swirled to effect a complete mixing of the mixture. After an induction period of 5 to 10 minutes, the mixture became noticeably more viscous, and after 20 to 25 minutes the temperature reached 35°–40° C. as the polymerization proceeded exothermically.

After the temperature reached 40° C. the mixture gelled within 5 minutes and the polymerization proceeded to completion at the boiling point of the solvent (75°–80° C.) as indicated by visible bubbling of the mixture and the presence of vapors at 75°–80° C. over the polymer mass. The heat of reaction required 15 to 30 minutes to evolve, and the mixture was allowed to cool and stand at room temperature for 24 hours. The bottle was cracked open to remove the polymer, and the benzene was evaporated in vacuum at 1 mm. Hg to yield 237.1 g. (72 percent) of rubbery product. The polymer produced was tack-free, relatively soft, milky white material. The intrinsic viscosity measured in chloroform at 30° C. was an average of 4.65, and the homopolymer had an average molecular weight as determined by light scattering measurement technique of 1,058,000.

The solubility of the polymer was determined as follows:

One gram of polypropylene sulfide was added to 100 ml. of each of four different reagent grade solvents and shaken for 24 hours at room temperature with the following results:

| Benzene | Insoluble—extensive swelling of polymer |
|---|---|
| Methylene Chloride | Less than 1% soluble—clear solution—extensive swelling of polymer |
| Hexane | Insoluble |
| Chloroform | Less than 1% soluble—clear solution—extensive swelling of polymer |

EXAMPLE XVII

A clean 30-ounce bottle was flushed with nitrogen, and 300 ml. of benzene was distilled from sodium directly into the bottle. To the bottle was added 25 ml. of a saturated solution of $H_2S$ in benzene (0.016 mols of $H_2S$ in 25 ml. of benzene at 20° C.), and 300 ml. of twice-distilled propylene sulfide was fractionally distilled into the bottle from calcium hydride using a 300 mm. Widmer column. Then 25.1 ml. (5 mol percent) of freshly distilled allylthioglycidyl ether (B.P. 85°–86° C./25 mm.) was added to the bottle by means of a pipette, and finally 0.016 mols diethyl zinc in a standard solution in benzene was added by means of a calibrated syringe. The mixture, which became cloudy immediately, was again blanketed with nitrogen. The bottle was capped with aluminum foil and swirled to effect a complete mixing of the mixture. After an induction period of 5 to 10 minutes, the mixture became noticeably more viscous, and after 20 to 25 minutes the temperature reached 35°–40° C. as the polymerization proceeded exothermically.

After the temperature reached 40° C. the mixture gelled within 5 minutes, and the polymerization proceeded to completion at the boiling point of the solvent (75°–80° C.) as indicated by visible bubbling of the mixture and the presence of vapors at 75°–80° C. over the polymer mass. The heat of reaction required 15 to 30 minutes to evolve, and the mixture was allowed to cool and stand at room temperature for 24 hours. The bottles were cracked open to remove the polymer, and the benzene was evaporated in vacuum at 1 mm. Hg.

The combined yield from 10 runs using the procedure of this example was 2,450 g. (84.6 percent) of tack-free, soft, milky white material. The polymer was soluble according to the solubility test procedure described in example XIII, and the intrinsic viscosity measured in chloroform at 30° C. was 2.68. An infrared analysis according to the procedure described in example XIV disclosed that the copolymer contained 3.74 mol percent of allylthioglycidyl ether.

The copolymer was cured for 30 minutes at 320° F. using the following cure formulation:

Parts by Weight

| | |
|---|---|
| Copolymer containing 3.74 mol % Allylthioglycidyl ether | 100 |
| Stearic Acid | 1 |
| Philblack O (High Abrasion Furnace Black) | 50 |
| Zinc Oxide | 5 |
| Sulfur | 1.5 |
| Tellurac | 1.5 |
| Benzothiazyl Disulfide | 1 |

The cured material had the following properties when measured at 75° F.:

| | |
|---|---|
| Tensile strength, p.s.i. | 650 |
| % Elongation | 230 |
| Hardness—Shore A | 71 |

EXAMPLE XVIII

A clean 30-ounce bottle was flushed with nitrogen, and 300 ml. of benzene was distilled from sodium directly into the bottle. To the bottle was added 25 ml. of a saturated solution of $H_2S$ in benzene (0.016 mols of $H_2S$ in 25 mol of benzene at 20° C.), and 300 ml. of twice-distilled propylene sulfide was fractionally distilled into the bottle from calcium hydride using a 300 mm. Widmer column. Then 50.2 ml. (10 mol %) of freshly distilled allylthioglycidyl ether (B.P. 85°–86° C./25 mm.) was added to the bottle by means of a pipette and finally 0.016 mols diethyl zinc in a standard solution in benzene was added by means of a calibrated syringe. The mixture, which became cloudy immediately, was again blanketed with nitrogen. The bottle was capped with aluminum foil and swirled to effect a complete mixing of the mixture. After an induction period of 5 to 10 minutes, the mixture became noticeably more viscous and after 20 to 25 minutes, the temperature reached 35°–40° C. as the polymerization proceeded exothermically.

After the temperature reached 40° C., the mixture gelled within 5 minutes, and the polymerization proceeded to completion at the boiling point of the solvent (75°–80° C.) as indicated by visible bubbling of the mixture and the presence of vapors at 75°–80° C. over the polymer mass. The heat of reaction required 15 to 30 minutes to evolve, and the mixture was allowed to cool and stand at room temperature for 24 hours. The bottles were cracked open to remove the polymer, and the benzene was evaporated in vacuum at 1 mm. Hg.

THe combined yield from 7 runs using the procedure of this example was 1,842 g. (83.6 percent) of a rubbery product. The products were tack-free, soft, milky-white materials. The polymer was soluble according to the solubility test procedure described in example XIII, and the intrinsic viscosity measured in chloroform at 30° C. was 2.38. An infrared analysis according to the procedure described in example XIV disclosed that the copolymer contained 4.78 mol percent allylthioglycidyl ether.

Eleven parts by weight of the copolymer containing 4.78 mol percent allylthioglycidyl ether was cured for 30 minutes at 320° F. using the cure formulation described in example XVI.

The cured material had the following properties when measured at 75° F.:

| | |
|---|---|
| Tensile strength, p.s.i. | 860 |
| % Elongation | 150 |
| Hardness, Shore A | 73 |

It is of course to be understood that the foregoing examples are illustrative only and that numerous changes can be made in the ingredients, proportions and conditions specifically disclosed without departing from the spirit of the invention as set forth in the appended claims.

We claim:
1. Elastomeric poly(1,2 propylene sulfide)homopolymer which has an intrinsic viscosity of at least 3 as measured at 30° C. in solution in a solvent selected from the group consisting of methylene chloride and chloroform.
2. Elastomeric poly(1,2 propylene sulfide)homopolymer which has an intrinsic viscosity of at least 3 as measured at 30° C. in solution in a solvent selected from the group consisting of methylene chloride and chloroform, said polymer being substantially insoluble in benzene.
3. An elastomeric polymer which consists essentially of monomer units of the structure

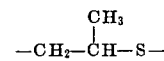

said polymer having an intrinsic viscosity of at least 2.38 as measured at 30° C. in solution in a solvent selected from the group consisting of methylene chloride and chloroform.

* * * * *

PO-1050
(5/69)

UNITED STATES PATENT OFFICE
CERTIFICATE OF CORRECTION

Patent No. 3,624,052      Dated November 30, 1971

Inventor(s) Riad H. Gobran and Stephen W. Osborn

It is certified that error appears in the above-identified patent and that said Letters Patent are hereby corrected as shown below:

Column 4, line 66, change "0.65" to --0.64--;

Column 6, line 4, change "40°C." to --42°C.--;

Column 9, line 21, change "mol" to --ml--;

Signed and sealed this 23rd day of May 1972.

(SEAL)
Attest:

EDWARD M. FLETCHER, JR.
Attesting Officer

ROBERT GOTTSCHALK
Commissioner of Patents